United States Patent [19]
Anvari

[11] Patent Number: 5,255,290
[45] Date of Patent: Oct. 19, 1993

[54] METHOD AND APPARATUS FOR COMBINED FREQUENCY OFFSET AND TIMING OFFSET ESTIMATION

[75] Inventor: Kiomars Anvari, Walnut Creek, Calif.

[73] Assignee: Teknekron Communications System, Inc., Berkeley, Calif.

[21] Appl. No.: 933,332

[22] Filed: Aug. 21, 1992

[51] Int. Cl.$^5$ .............................................. H04L 27/06
[52] U.S. Cl. ......................................... 375/97; 375/83
[58] Field of Search ..................... 375/10, 81, 97.83; 455/226.1, 226.2, 226.3; 329/307, 360, 346; 328/162

[56] References Cited

U.S. PATENT DOCUMENTS

| | | | |
|---|---|---|---|
| 4,485,477 | 11/1984 | Nosen | 375/97 |
| 4,835,790 | 5/1989 | Yoshida et al. | 455/226.3 |
| 4,879,728 | 11/1989 | Tarallo | 375/97 |
| 4,943,982 | 7/1990 | O'Neil, II et al. | 375/97 |
| 5,062,123 | 10/1991 | Geile et al. | 329/307 |
| 5,150,384 | 9/1992 | Cahill | 329/360 |

Primary Examiner—Stephen Chin
Attorney, Agent, or Firm—Limbach & Limbach

[57] ABSTRACT

A method and apparatus for generating a frequency offset estimate and a timing offset estimate from a base band signal. In an important application of the invention, a modulated carrier signal is transmitted over a transmission channel and then received and demodulated to generate the base band signal. The modulated carrier signal comprises data having a transmitted symbol frequency and phase, and a carrier signal modulated by the data. The invention simultaneously generates from the base band signal a frequency offset estimate representing the difference between the transmitted and received carrier signal frequency, and a timing offset estimate representing the difference between the transmitted symbol phase and the recovered symbol phase of the base band signal. In preferred embodiments, the base band signal is a digital signal sampled at a rate which exceeds the Nyquist rate. Typically, a sampling rate of more than two samples per symbol is adequate to meet this condition. A pair of nonlinear operations is performed on this digital base band signal, and the resulting two nonlinear signals are processed to generate the frequency offset and timing offset estimates.

14 Claims, 2 Drawing Sheets

METHOD AND APPARATUS FOR COMBINED FREQUENCY OFFSET AND TIMING OFFSET ESTIMATION

FIELD OF THE INVENTION

The invention relates to methods and apparatus for performing frequency offset and timing offset estimation. In some embodiments, the invention is a digital circuit which performs frequency offset and timing offset estimation on a base band signal that has been recovered by the receiver of a synchronous communication system, and a method implemented by such a circuit.

BACKGROUND OF THE INVENTION

Symbol synchronization (timing recovery) and frequency offset correction (carrier recovery) are two of the most critical receiver functions in synchronous communications systems. In systems of this type, the receiver clock must be continuously adjusted in frequency and phase in order to optimize the sampling instants of the data signal recovered from each received signal. The choice of sampling time is critical for minimization of the error probability due to intersymbol interference and noise, particularly when the received signal is subjected to sharp roll-off filtering during the process of recovering the data signal from it.

To avoid performance degradation caused by carrier phase and frequency error, the incoming signal carrier must be tracked. The timing and carrier frequency information are often derived from the recovered data signal itself, based on some meaningful optimization criterion which determines the steady-state location of the timing instants and received carrier frequency.

Digital radio receivers often employ circuitry for tracking the carrier frequency of a received signal, and automatically correcting for discrepancies in between the carrier frequency and the frequency of a local oscillator in the receiver (e.g., a local oscillator used for superheterodyne reception). They also employ timing recovery circuitry to enable correct recovery of digital data conveyed by each received signal.

In mobile communication environments in which a modulated carrier is subject to fast multi-path fading, most conventional continuous time synchronization techniques cannot perform satisfactorily. In such environments, the most practical synchronization techniques are those which derive synchronization information from the sampled, recovered data. In time domain multiple access systems in which each user is assigned a time slot, the receiver must perform its timing and frequency synchronization task on a slot by slot basis. Because such systems usually employ automatic frequency control circuitry to perform frequency synchronization (and such automatic frequency control circuitry have inherent frequency error), the timing recovery circuitry employed must accommodate at least a limited amount of frequency error without significant degradation in performance.

There are several types of conventional timing recovery techniques. Examples of such techniques include comparison of the threshold crossings of recovered base band data with the sampling phase, measurement of the phase of narrow-band-pass filtered base band data (where the narrow band-pass filter is centered at a receiver clock frequency), "differentiate and multiply" techniques which generate an error signal (during each sample interval) proportional to the product of the time derivative of the base band signal at each sampling time and the polarity of the base band signal at such time, and techniques which employ a bank of all-pass filters to estimate timing offset of a base band signal having a frame structure which contains a synchronization field.

There are also several conventional automatic frequency control techniques that have been used in receivers which process amplitude shift keyed (ASK) or quadrature phase shift keyed (QPSK) signals. Examples of such techniques include "differentiate and multiply" techniques of the type mentioned above, cross product discriminator techniques, discrete Fourier transform techniques, techniques which employ a bank of all-pass filters to estimate frequency offset of a base band signal having a frame structure which contains a synchronization field, and techniques (commonly employed in analog receivers) which use the principle of frequency counters.

It would be desirable to implement rapid combined timing error and frequency error estimation in a receiver (to enable rapid adjustment for both timing and frequency error). It would be particularly desirable to do so in a robust manner, which functions well in the presence of a variety of transmission channel impairments and in a fast fading environment. The present invention is a method and apparatus for performing such robust, combined timing error and frequency error estimation. The invention can be implemented in a variety of receivers (including receivers which receive and process ASK or QPSK signals). The invention is particularly useful in cellular radio-telephone receivers, although it is also useful in other types of radio telephone receivers and in computer and other data communication systems.

SUMMARY OF THE INVENTION

The invention is a method and apparatus for generating both a frequency offset estimate and a timing offset estimate from a base band signal. In an important application of the invention, a modulated carrier signal is transmitted over a transmission channel and then received and demodulated to generate the base band signal. The modulated carrier signal comprises data (having a transmitted symbol frequency and phase) and a carrier signal (having a transmitted carrier frequency) modulated by the data. The invention simultaneously generates a frequency offset estimate and a timing offset estimate from the base band signal. The frequency offset estimate represents the difference between the received carrier frequency and locally generated carrier signal frequency, and the timing offset estimate represents the difference between the transmitted symbol phase and the locally generated symbol phase of the base band signal.

In preferred embodiments, the base band signal is a digital signal sampled at a clock frequency which exceeds or equals the Nyquist rate (using a clock signal having a clock phase). Typically, a sampling rate (clock frequency) of two samples per symbol is adequate to meet this condition. A pair of nonlinear operations is performed on this digital base band signal, and the resulting two nonlinear signals are further processed (simultaneously) to generate the frequency offset estimate and a timing offset estimate.

In a class of such preferred embodiments, the digital base band signal to be processed is a complex signal $r(t)$ having in-phase and quadrature-phase components. The first nonlinear operation generates a first nonlinear signal of form $[r(t)][r^*(t-T)]$, where $r^*(t)$ is the complex conjugate of signal $r(t)$, and $T$ is the transmitted symbol period, and the second nonlinear operation generates a second nonlinear signal of form $[r(t)][r^*(t+T)]$. The first and second nonlinear signals are simultaneously processed to generate a frequency offset estimate and a timing offset estimate for signal $r(t)$.

The preferred embodiment of the inventive apparatus is a digital electronic circuit, including nonlinear processing circuitry for generating parallel first and second nonlinear signals, means for bandpass filtering the nonlinear signals (where the bandpass filter pass band is centered at the transmitted symbol frequency), circuitry for averaging the filtered nonlinear signals over many transmitted symbol periods, circuitry for generating a frequency offset estimate from a first one of the filtered, time-averaged nonlinear signals, and circuitry for generating a timing offset estimate from the other filtered, time-averaged nonlinear signal.

DETAILED DESCRIPTION OF THE PREFERRED EMBODIMENTS

Figure 1:
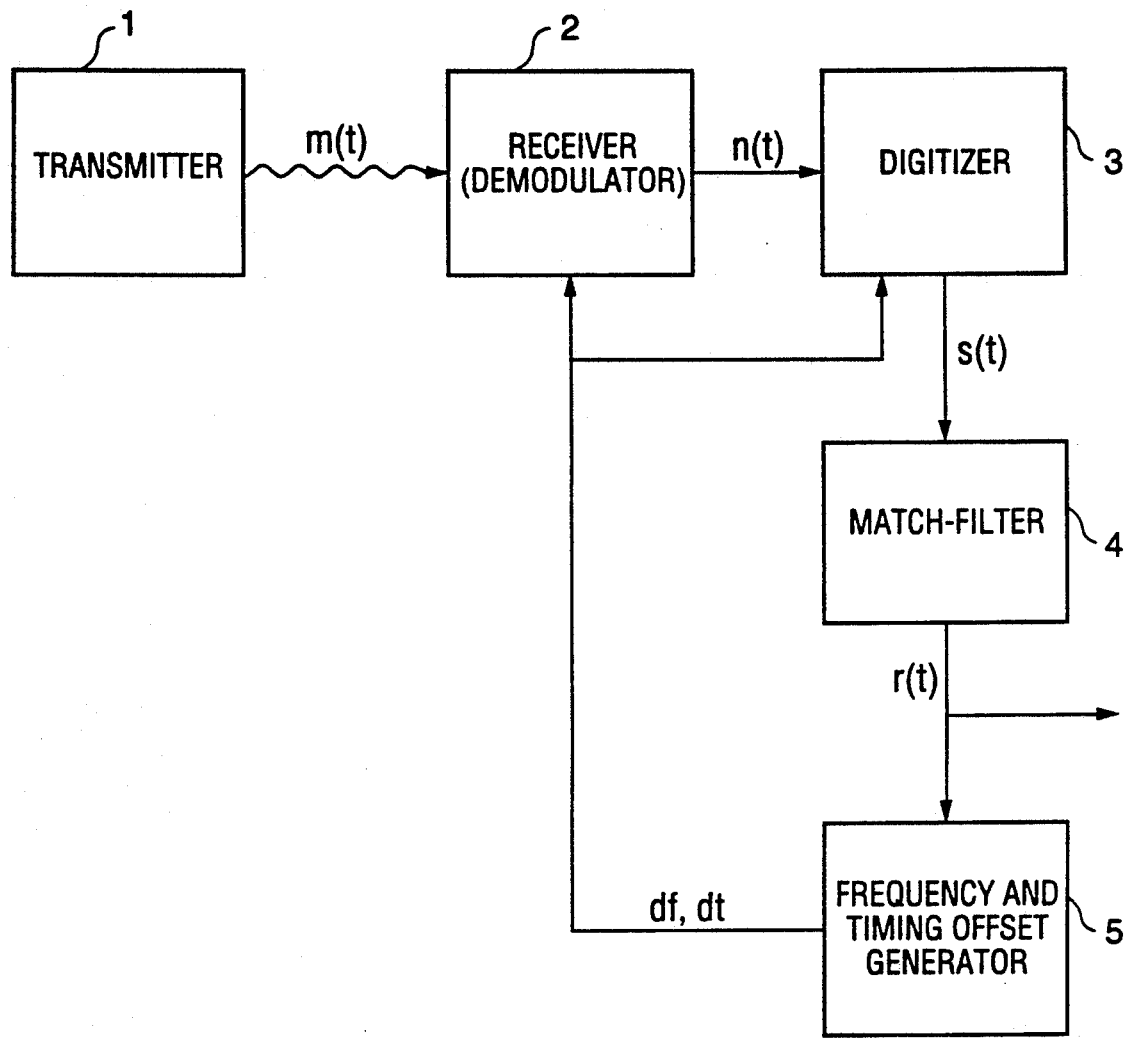
FIG. 1 is a block diagram of a synchronous communication system which include an embodiment of the inventive apparatus.

The invention can be embodied in a synchronous communication system such as that shown in FIG. 1. Signal transmitter 1 of FIG. 1 transmits signal m(t) to receiver 2. Signal m(t) is a carrier signal modulated with data. The data are transmitted with a symbol period T, a symbol frequency 1/T, and a phase, and the carrier signal is transmitted from transmitter 1 with a carrier frequency F. Modulation of the carrier signal can be accomplished in a variety of conventional ways. For example, signal m(t) can be an amplitude shift keyed (ASK) or quadrature phase shift keyed (QPSK) signal.

Receiver 2 receives and demodulates signal m(t) to generate analog base band signal n(t), and digitizer 3 samples signal n(t) using a local clock signal to generate digital base band signal s(t), which is typically a complex signal having an in-phase digital component signal and a quadrature-phase digital component signal. To avoid aliasing problems, the sampling rate implemented by digitizer 3 exceeds or equals the Nyquist rate associated with the transmitted data. Typically, a sampling rate of two samples per symbol is adequate to meet or exceed this condition.

Base band signal s(t) is then processed in match filter 4 to generate filtered digital base band signal r(t). Filter 4 performs anti-aliasing, intersymbol interference reduction, and/or noise reduction functions, and can have a conventional design.

Circuit 5, which embodies the invention, includes circuitry for performing frequency offset and timing offset estimation on signal r(t) to generate an estimate ("df") of the frequency offset between received signal m(t)'s carrier frequency and the locally generated carrier frequency F, and an estimate ("dt") of the timing offset between the phase of received base band signal r(t) and a locally generated symbol clock.

Frequency offset and timing offset estimate signals df and dt can be fed back to receiver 2 or digitizer 3 (or to both receiver 2 and digitizer 3), for use in demodulating received signal m(t) and/or generating a clock signal having optimal phase and frequency for sampling analog signal n(t) to generate digital signal s(t).

Figure 2:
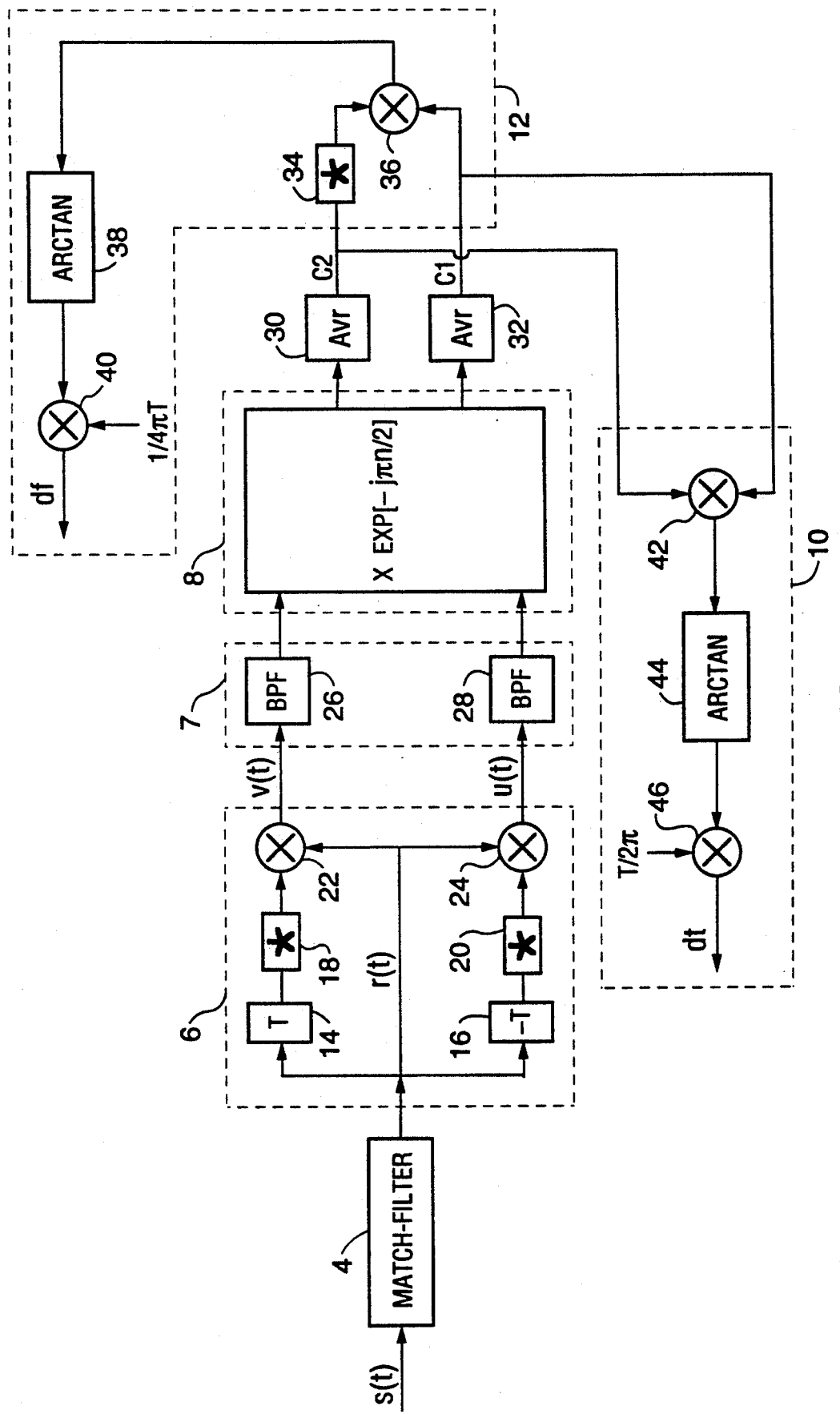
FIG. 2 is a block diagram of a preferred embodiment of the inventive apparatus.

Next, with reference to FIG. 2, we describe a preferred embodiment of the inventive frequency and timing offset estimation apparatus, whose elements 6, 7, 8, 10, 12, 30, and 32, can together be employed as circuit 5 of the FIG. 1 apparatus. In the FIG. 2 embodiment, match filter 4 is identical to filter 4 described above with reference to FIG. 1. In the FIG. 2 embodiment, digital input signal s(t) received by match filter 4 is a complex signal having an in-phase digital component signal and a quadrature-phase digital component signal. The sampling rate of signal s(t) exceeds the Nyquist rate, and is preferably equal to two samples per symbol.

With reference to FIG. 2, filtered base band signal r(t) asserted at the output of filter 4 is processed in nonlinear processing circuit 6. Signal r(t) is a complex signal having an in-phase digital component signal I(t) and a quadrature-phase digital component signal Q(t). Signal r(t) is indicative of a stream of digital data which has been transmitted with a known symbol frequency 1/T, symbol period T, and phase, but which exhibits frequency offset and timing offset (for example, as a result of transmission through a transmission channel and reception).

The function of nonlinear processing circuit 6 is to generate the following two signals from filtered base band signal r(t): $u(t) = [r(t)][r^*(t-T)]$, and $v(t) = [r(t)][r^*(t+T)]$, where $r^*(t)$ is the complex conjugate of signal r(t). Nonlinear processing circuit 6 includes phase delay circuit 14, phase advance circuit 16, identical complex conjugation circuits 18 and 20, and identical multiplication circuits 22 and 24. Phase delay circuit 14 receives signal r(t) and generates a delayed version thereof, r(t−T), which is delayed by one symbol period T relative to signal r(t). Phase advance circuit 16 also receives signal r(t) and generates a phase-advanced version thereof, r(t+T), which is advanced by one symbol period relative to signal r(t).

Circuit 18 performs a complex conjugation operation on the output of circuit 14 to generate the signal $r^*(t-T)$, and circuit 20 performs a complex conjugation operation on the output of circuit 16 to generate the signal $r^*(t+T)$. The output of circuit 18 is connected to a first input of multiplier 22, the output of circuit 20 is connected to a first input of multiplier 24, and signal r(t) is supplied to a second input of each of multipliers 22 and 24. The output of multiplier 24 is signal $u(t) = [r(t)][r^*(t+T)]$, and the output of multiplier 22 is signal $v(t) = [r(t)][r^*(t-T)]$.

In the case that signal s(t) received at filter 4 is received from a digital receiver (such as the receiver comprising elements 2 and 3 shown in FIG. 1), the periodic component of signal V(t) at the transmitted symbol frequency 1/T has phase $A+B+\pi$ radians, where A is proportional to the receiver demodulator frequency offset (e.g., the frequency offset described above with reference to FIG. 1 between received signal m(t)'s carrier frequency and locally generated carrier frequency F), and B is proportional to the timing offset (e.g., the phase offset described above with reference to FIG. 1 between the phase of signal s(t) and phase of the locally generated symbol clock. Also in this case, the periodic component of signal U(t) at the transmitted symbol frequency 1/T has phase $[-(A)+B+\pi$ radians].

Thus, both the demodulator frequency offset and the timing offset can be estimated by determining and appropriately processing the phases of signals u(t) and v(t). The remaining components of the FIG. 2 apparatus perform this function.

Signals v(t) and u(t) are band pass filtered in band pass filter circuitry 7. In a preferred embodiment of circuitry 7, signal U(t) from multiplier 22 is filtered in band pass filter 26 and signal V(t) from multiplier 24 is filtered in an identical band pass filter 28. The pass band of each of filters 26 and 28 is centered at the transmitted symbol frequency (1/T).

The band pass filtered signals V(t) and U(t) that are output from band pass filter circuitry 7 undergo complex demodulation in circuitry 8. In a preferred embodiment, circuitry 8 demodulates band pass filtered signal U(t) from filter 26 to generate a first DC signal, and demodulates ban pass filtered signal V(t) from filter 28 to generate a second DC signal. The first DC signal is indicative of the above-mentioned phase error (A + B), and the second DC signal is indicative of the above-mentioned phase error [−(A)+B]. Thus, each of the first DC signal and the second DC signal is indicative of combined demodulator frequency offset error and timing offset error.

The first and second DC signals output from circuit 8 are supplied, respectively, to averaging circuits 30 and 32. Averaging circuit 30 averages the first DC signal to generate time averaged signal C2, and averaging circuit 32 averages the second DC signal to generate time averaged signal C1. In the above-described case in which the periodic component of signal u(t) at the transmitted symbol frequency 1/T has phase [A+B+π], signals C1 and C2 will have form:

$$C2 = (D2)\, e^{j(2\pi(df)T - 2\pi(dt)/T + \pi)}, \text{ and}$$

$$C1 = (D1)\, e^{j(-2\pi(df)T - 2\pi(dt)/T + \pi)},$$

where D1 and D2 are constants, df is an estimate of the frequency offset between received signal's carrier frequency and the locally generated carrier frequency F, and dt is an estimate of the timing offset between the phase of the data modulating the transmitted signal and the phase of the base symbol clock. The phase of signal C1 and signal C2 can thus be processed to generate estimates of both the frequency offset error and the timing offset error.

Each of circuits 30 and 32 averages its input signal over the same number of symbol periods. Preferably, to obtain accurate estimate signals df and dt (the signals output from circuits 12 and 10), each of averaging circuits 30 and 32 averages its input signal over several tens or hundreds of symbol periods.

Time-averaged signals C1 and C2 are processed in frequency offset estimation circuit 12 to generate frequency offset signal df, and are simultaneously processed in timing offset estimation circuit 10 to generate timing offset signal dt.

Circuit 12 includes complex conjugation circuit 34, multiplication circuit 36, arctangent circuit 38, and multiplication circuit 40. Circuit 34 generates a signal C2*, which is the complex conjugate of signal C2, and signal C2* is multiplied by signal C1 in circuit 36 to generate a product signal (having value A). Circuit 38 then processes the product signal to generate an arctangent signal whose value is substantially equal to the arctangent of the value A (i.e., arctan(A)). Circuit 40 then multiplies the arctangent signal output from circuit 38 by a signal having amplitude 1/4πT, to generate the estimate signal df.

Circuit 10 includes multiplication circuits 42 and 46, and arctangent circuit 44. Signal C2 is multiplied by signal C1 in circuit 42 to generate a product signal (having value A'). Circuit 44 then processes the product signal to generate an arctangent signal having value substantially equal to the arctangent of A'. Circuit 40 then multiplies the arctangent signal output from circuit 44 by a signal having amplitude T/2π, to generate the estimate signal dt.

Various modifications and alterations in the described method and apparatus of the invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A method for generating a frequency offset estimate and a timing offset estimate from a base band signal, wherein the base band signal is a digital signal r(t) indicative of digital data which have been transmitted with a symbol frequency 1/T and a phase, but which have been received after transmission with a frequency offset error and a timing offset error, wherein the digital signal r(t) is a complex signal having a complex conjugate signal r*(t), including the steps of:

(a) performing a first nonlinear operation on the base band signal to generate a first nonlinear signal;
    (b) while performing step (a), performing a second nonlinear operation on the base band signal to generate a second nonlinear signal, wherein the first nonlinear signal has form (r(t))(r*(t-T)), where T=(1/T)$^{-1}$, and the second nonlinear signal has form (r(t))(r*(t+T)); and
    (c) processing the first nonlinear signal and the second nonlinear signal to generate the frequency offset estimate, and simultaneously processing the first nonlinear signal and the second nonlinear signal to generate the timing offset estimate.

2. The method of claim 1, also including the steps of:
    transmitting a modulated carrier signal, wherein the modulated carrier signal comprises a carrier signal having a transmitted carrier frequency, and wherein the modulated carrier signal is modulated by the digital data; and
    receiving and demodulating the modulated carrier signal to generate a demodulated signal, and digitizing the demodulated signal to generate the base band signal.

3. The method of claim 2, wherein the digital data have a Nyquist rate, and wherein the step of digitizing the demodulated signal includes the step of sampling the demodulated signal at a sampling rate which exceeds the Nyquist rate.

4. The method of claim 1, wherein step (c) includes the steps of:
    bandpass filtering the first nonlinear signal and the second nonlinear signal with a pass band centered at the symbol frequency 1/T, to generate a first filtered nonlinear signal and a second filtered nonlinear signal;
    performing a complex demodulation operation on the first filtered nonlinear signal to generate a first DC signal, and performing a complex demodulation on the second filtered nonlinear, signal to generate a second DC signal;

averaging the first DC signal over a first number of symbol periods T to generate a first averaged signal, and averaging the second DC signal over a number, substantially equal to the first number, of symbol periods T to generate a second averaged signal; and processing the first averaged signal and the second averaged signal to generate the frequency offset estimate, and simultaneously processing the first averaged signal and the second averaged signal to generate the timing offset estimate.

5. The method of claim 1, wherein the first averaged signal has a value C1 and the second averaged signal has a value C2, where $C2=(D2)\ e^{j(2\pi(df)T-2\pi(dt)/T+\pi)}$, and $C1=(D1)\ e^{j(-2\pi(df)T-2\pi(dt)/T+\pi)}$, where D2 is a first constant value, D1 is a second constant value, df is the frequency offset estimate, and dt is the timing offset estimate.

6. The method of claim 5, wherein the step of processing the first averaged signal and the second averaged signal to generate the frequency offset estimate includes the steps of:

generating a complex conjugate of the second averaged signal;

multiplying the first averaged signal by said complex conjugate to generate a product signal having a value A;

processing the product signal to generate an arctangent signal having a value substantially equal to arctan(A); and scaling the arctangent signal to generate the frequency offset estimate.

7. The method of claim 5, wherein the step of processing the first averaged signal and the second averaged signal to generate the timing offset estimate includes the steps of:

multiplying the first averaged signal by the second averaged signal to generate a product signal having a value A;

processing the product signal to generate an arctangent signal having the value substantially equal to arctan(A); and scaling the arctangent signal to generate the timing offset estimate.

8. An apparatus for generating a frequency offset estimate and a timing offset estimate from a base band signal, wherein the base band signal is a digital signal r(t) indicative of digital data which have been transmitted with a symbol frequency 1/T and a phase, but which have been received after transmission with a frequency offset error and a timing offset error, wherein the digital signal r(t) is a complex signal having a complex conjugate signal r*(t), said apparatus including:

first means for performing a first nonlinear operation on the base band signal to generate a first nonlinear signal;

second means, connected in parallel with the first means, for performing a second nonlinear operation on the base band signal to generate a second nonlinear signal, wherein the first nonlinear signal has form (r(t))(r*(t−T)), wherein $T=(1/T)^{-1}$, and the second nonlinear signal has form (r(t))(r*(t+T)); and means for processing the first nonlinear signal and the second nonlinear signal to generate, substantially simultaneously, the frequency offset estimate and the timing offset estimate.

9. The apparatus of claim 8, also including:

means for transmitting a modulated carrier signal, said modulated carrier signal comprising a carrier signal having a transmitted carrier frequency, wherein the modulated carrier signal is modulated by the digital data;

means for receiving and demodulating the modulated carrier signal to generate a demodulated signal; and means for digitizing the demodulated signal to generate the base band signal.

10. The apparatus of claim 9, wherein the digital data have a Nyquist rate, and wherein the means for digitizing the demodulated signal is a means for sampling the demodulated signal at a sampling rate which exceeds the Nyquist rate.

11. The apparatus of claim 8, wherein the means for processing the first nonlinear signal and the second nonlinear signal includes:

bandpass filter means for bandpass filtering the first nonlinear signal and the second nonlinear signal to generate a first filtered nonlinear signal and a second filtered nonlinear signal, said bandpass filter means having a pass band centered at the symbol frequency 1/T;

means for performing a complex demodulation operation on the first filtered nonlinear signal to generate a first DC signal, and for performing a complex demodulation on the second filtered nonlinear signal to generate a second DC signal;

means for averaging the first DC signal over a first number of symbol periods T to generate a first averaged signal, and for averaging the second DC signal over a number, substantially equal to the first number, of symbol periods T to generate a second averaged signal;

first processing means for processing the first averaged signal and the second averaged signal to generate the frequency offset estimate; and second processing means, connected in parallel with the first processing means, for processing the first averaged signal and the second averaged signal to generate the timing offset estimate.

12. The apparatus of claim 11, wherein the first averaged signal has a value C1 and the second averaged signal has a value C2, where $C2=(D2)\ e^{j(2\pi(df)T-2\pi(dt)/T+\pi)}$, and $C1=(D1)\ e^{j(-2\pi(df)T-2\pi(dt)/T+\pi)}$, where D1 is a first constant value, D2 is a second constant value, df is the frequency offset estimate, and dt is the timing offset estimate.

13. The apparatus of claim 12, wherein the first processing means includes:

means for generating a complex conjugate of the second averaged signal;

means for multiplying the first averaged signal by said complex conjugate to generate a product signal having a value A;

means for processing the product signal to generate an arctangent signal having a value substantially equal to arctan(A); and means for scaling the arctangent signal to generate the frequency offset estimate.

14. The apparatus of claim 12, wherein the second processing means includes:

means for multiplying the first averaged signal by the second averaged signal to generate a product signal having a value A;

means for processing the product signal to generate an arctangent signal having a value substantially equal to arctan(A); and means for scaling the arctangent signal to generate the timing offset estimate.

* * * * *